United States Patent
Oyman et al.

(10) Patent No.: US 8,472,467 B2
(45) Date of Patent: Jun. 25, 2013

(54) WIRELESS DEVICE AND METHODS FOR OPPORTUNISTIC SCHEDULING IN A CONTENTION-BASED WIRELESS NETWORK

(75) Inventors: Ozgur Oyman, San Jose, CA (US);
Qinghua Li, San Ramon, CA (US);
Xintian E Lin, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 231 days.

(21) Appl. No.: 12/491,381

(22) Filed: Jun. 25, 2009

(65) Prior Publication Data
US 2010/0329131 A1 Dec. 30, 2010

(51) Int. Cl.
*H04L 12/413* (2006.01)

(52) U.S. Cl.
USPC ...... 370/445; 370/252; 370/432; 370/395.21; 370/328; 370/282

(58) Field of Classification Search
None
See application file for complete search history.

(56) References Cited

U.S. PATENT DOCUMENTS

| | | | | |
|---|---|---|---|---|
| 6,738,599 | B2 * | 5/2004 | Black et al. | 455/62 |
| 7,391,789 | B2 * | 6/2008 | Kang et al. | 370/445 |
| 7,792,138 | B2 * | 9/2010 | Hahm et al. | 370/462 |
| 2005/0239411 | A1 * | 10/2005 | Hazra et al. | 455/67.11 |
| 2007/0165587 | A1 * | 7/2007 | Choi | 370/338 |
| 2008/0112342 | A1 * | 5/2008 | Bennett | 370/310 |
| 2009/0046653 | A1 * | 2/2009 | Singh et al. | 370/330 |
| 2009/0274224 | A1 * | 11/2009 | Harris | 375/260 |
| 2010/0261469 | A1 * | 10/2010 | Ribeiro et al. | 455/423 |

* cited by examiner

*Primary Examiner* — Kibrom T Hailu
(74) *Attorney, Agent, or Firm* — Schwegman, Lundberg & Woessner, P.A.

(57) ABSTRACT

Embodiments of a wireless device and method for channel access are generally described herein. In some embodiments, the wireless device is configured to measure channel quality and set a backoff delay for channel access based on the channel quality. Shorter backoff delays are set for better channel quality and longer backoff delays are set for poorer channel quality.

17 Claims, 6 Drawing Sheets

WIRELESS NETWORK

US 8,472,467 B2

WIRELESS DEVICE AND METHODS FOR OPPORTUNISTIC SCHEDULING IN A CONTENTION-BASED WIRELESS NETWORK

TECHNICAL FIELD

Embodiments pertain to wireless communications. Some embodiments pertain to contention-based wireless networks that implement a random access protocol. Some embodiments pertain to wireless networks that operate in accordance with some of the IEEE 802.11 standards.

BACKGROUND

In wireless networks that implement a random access protocol, such as a Carrier Sense Multiple Access With Collision Avoidance (CSMA/CA) protocol, client devices contend for use of the same channel. After a successful contention, a client device is given access to the channel for reception or transmission of data packets. One issue with this contention process is that client devices experiencing poor channel conditions are generally given equal access to the channel. As a result, these client devices end up transmitting their data packets at lower rates due to the poor channel conditions, which, among other things, degrades overall network throughput.

Thus, there are general needs for wireless networks and methods of scheduling wireless devices in contention-based networks that take into account channel conditions of the wireless devices and help prevent the overall network throughput from degrading.

DETAILED DESCRIPTION

The following description and the drawings sufficiently illustrate specific embodiments to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments set forth in the claims encompass all available equivalents of those claims.

Figure 1:
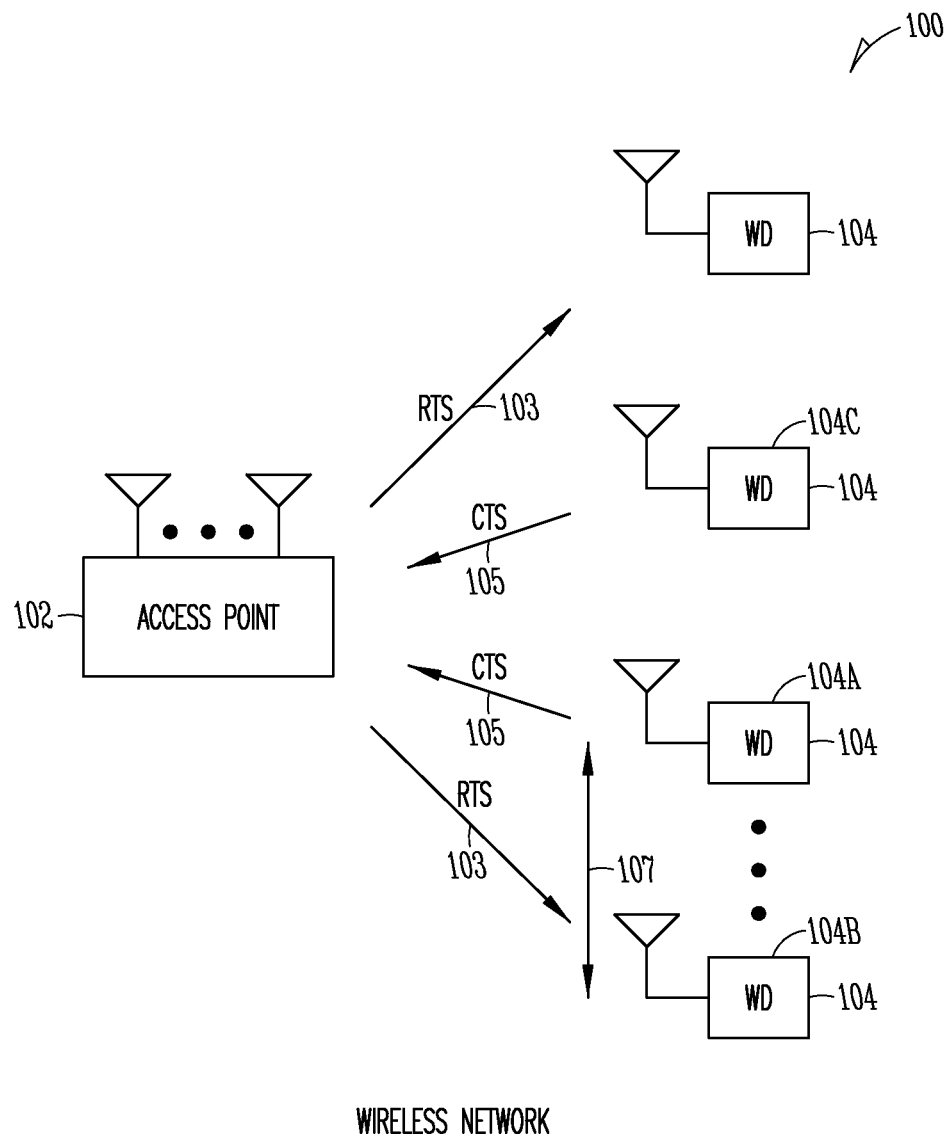
FIG. 1 illustrates a wireless network in accordance with some embodiments.

FIG. 1 illustrates a wireless network in accordance with some embodiments. Wireless network 100 includes an access point 102 and a plurality of wireless devices 104. Wireless network 100 is a contention-based network in which wireless devices 104 contend for use of the same channel, illustrated as random-access channel 103. After a successful contention, a client device is given access to the channel 103 for transmission or reception of data packets. In some embodiments, wireless network 100 may implement a random-access protocol, such as CSMA/CA protocol in accordance with one of the IEEE 802.11 standards, such as the IEEE 802.11-2007 standard or the IEEE 802.11n standards, although the scope of the embodiments is not limited in this respect.

In some embodiments, wireless network 100 takes into account channel conditions as part of its channel access scheduling process. In these embodiments, channel access is conditioned or limited for wireless devices 104 with poorer channel conditions. Wireless devices 104 with better relative channel quality, on the other hand, may gain access to the channel 103 more quickly. Wireless network 100 may also help prevent the overall network throughput from degrading by reducing or limiting access to wireless devices 104 with poorer channel conditions.

In accordance with embodiments, a wireless device, such as wireless device 104A, may be configured to measure channel quality and set a backoff delay for channel access based on the measured channel quality. In these embodiments, shorter backoff delays are set for better channel quality and longer backoff delays are set for poorer channel quality. For example, wireless device 104A may have better channel quality and may set a shorter backoff delay, and wireless device 104B may have poorer channel quality and may set a longer backoff delay.

In some embodiments, the wireless device 104A may measure the channel quality of the random-access channel 103 between the wireless device 104A and the access point 102 based on a request-to-send (RTS) packet that is transmitted or broadcasted by the access point 102 on the random-access channel 103. The wireless device 104A may send a clear-to-send (CTS) packet on the random-access channel 103 in response to the RTS packet at a time after the set backoff delay.

In some embodiments, a signal-to-noise ratio (SNR) may be used to indicate channel quality. In these embodiments, shorter backoff delays are set for wireless devices 104 with better SNR and longer backoff delays are set for poorer SNR.

In some embodiments, wireless device 104A may set the backoff delay based on a channel quality relative to channel qualities of the random-access channel associated with other wireless devices 104 in the network 100. In these embodiments, wireless devices 104 with the better relative channel quality will utilize shorter backoff delays and wireless devices 104 with poorer relative channel quality will utilize longer back off delays. In this way, wireless devices 104 with better relative channel quality may gain access to the channel 103 more quickly.

In client-coordination embodiments, wireless device 104A may be configured to receive channel quality information from one or more of the other wireless devices 104 over one or more low-latency radio links 107. The low-latency radio links 107 may be established directly with one or more of the other wireless devices 104 (i.e., established generally without the use or knowledge of access point 102). The low-latency radio links 107 may be peer-to-peer (P2P) radio links, although this is not a requirement.

In these client-coordination embodiments, wireless device 104A may determine the channel quality of random-access channel 103 relative to the channel qualities of the random-access channel associated with the other wireless devices 104. In these embodiments, the instantaneous channel qualities of the other wireless devices 104 may be used to determine the relative channel quality for setting the backoff delay for device 104A. In some of these embodiments, the wireless devices 104 may exchange channel quality information directly with each other. Alternately, a master wireless device may be designated (i.e., one of wireless devices 104) to collect channel quality information from the wireless devices 104 and provide average channel quality information for the wireless devices 104 over the low-latency radio links 107. In these embodiments, the master wireless device may schedule access to the low-latency radio links 107. For example, the master wireless device may schedule access to a low-latency radio link 107 in accordance with a round-robin algorithm or based on other criteria such as maximum SNR.

In some client-coordination embodiments, the low-latency radio links 107 may utilize a different frequency channel than the frequency channel used for the random-access channel 103. In these embodiments, wireless devices 104 may include separate transceivers for communications over random-access channel 103 and communications over low-latency radio links 107.

In these client-coordination embodiments, the channel quality information may be received by wireless device 104A from one or more of the other wireless devices 104 over the low-latency radio links 107 during a contention phase of the random channel-access protocol. For example, the channel quality information may be received over the low-latency radio links 107 immediately after receipt of an RTS packet. In this way, the instantaneous channel quality information can be used to determine relative channel quality, although this is not a requirement.

In some embodiments, the low-latency radio links 107 may be millimeter-wave links that utilize frequencies in the 60-GHz range, although this is not a requirement. Techniques to establish ad-hoc or mesh network links may be used to establish the low-latency radio links 107, although this is not a requirement. In some alternate embodiments, the low-latency radio links 107 may comprise ad-hoc or mesh network radio links that utilize a different frequency channel than random-access channel 103.

In embodiments without client coordination, the access point 102 may be configured to provide the average channel quality of some or all of the other wireless devices 104 in the network 100 to wireless device 104A for use by the wireless device 104A in determining the channel quality relative to the channel qualities of the random-access channel associated with the other wireless devices 104 in the network 100. In these embodiments, the access point 102 may receive the channel quality from each of the wireless devices 104 as part of a CTS packet and may calculate the average channel quality. The access point 102 may provide the average channel quality to each of the wireless devices 104 as part of an RTS packet, although the scope of the embodiments is not limited in this respect. Each wireless device 104 may be configured to determine whether its channel is statistically better or poorer than the average channel quality. In these embodiments, each wireless device 104 may determine whether it has a channel that is statistically better or worse than the average channel and set its backoff delay accordingly.

In some alternate embodiments, rather than providing an average channel quality, the access point 102 may provide the channel quality of a wireless device with the best channel quality for use by a wireless device in determining its relative channel quality.

In some embodiments, the wireless devices 104 may further adjust the backoff delay based on a random exponential backoff time to help prevent collisions between wireless devices 104 with similar channel conditions (e.g., similar relatively better channel conditions). In this way, wireless devices, such as wireless devices 104A and 104C, that have similar relatively better channel conditions can still set relatively short backoff delays and are less likely to collide. These embodiments are discussed in more detail below.

In some embodiments, the backoff delay may be further adjusted to implement a proportional fairness access technique to help ensure fair access opportunities for the wireless devices 104 that consistently have poorer channel quality. In these embodiments, wireless device 104B may shorten the backoff delay when poorer channel conditions have consistently caused longer backoff delays to be set resulting in fewer opportunities for channel access. The backoff delay may also be adjusted based on queue sizes to allow wireless devices 104 with more data to allow for faster channel access. The backoff delay may also be updated periodically to reflect changes in channel conditions.

In multichannel embodiments, wireless network 100 is a multichannel network in which two or more random-access channels 103 are used for communicating with wireless devices 104. In these multichannel embodiments, each random-access channel 103 utilizes a different frequency channel. In these embodiments, the access point 102 may broadcast an RTS packet on two or more random-access channels 103. The wireless devices 104 may measure the channel quality for the random-access channels 103 based on receipt of the RTS packet, select the random-access channel 103 with the best channel quality, set a backoff delay based on a relative channel quality of the selected channel, and send a CTS packet on the selected channel 103 at a time after the backoff delay. In this way, wireless devices 104 operating in a multichannel wireless network may select a random-access channel based on channel conditions and may set the backoff delay for channel access based on channel conditions. In these embodiments, wireless devices 104 may include a multichannel transceiver for communicating over the different frequency channels utilized by each of the random-access channels 103.

In some embodiments, wireless devices 104 and access point 102 may be configured to communicate Orthogonal Frequency Division Multiplexed (OFDM) communication signals over a random-access channel 103. The OFDM signals may comprise a plurality of orthogonal subcarriers. In some other embodiments, wireless devices 104 and access point 102 may be configured to communicate signals that were transmitted using one or more other modulation techniques such as spread spectrum modulation (e.g., Direct Sequence Code Division Multiple Access (DS-CDMA) and/or Frequency Hopping Code Division Multiple Access (FH-CDMA)), Time-Division Multiplexing (TDM) modulation, and/or Frequency-Division Multiplexing (FDM) modulation, although the scope of the embodiments is not limited in this respect. Wireless network 100 may be a wireless local area network (WLAN) such as a Wireless Fidelity (WiFi) network. In some embodiments, wireless devices 104 and access point 102 may be configured to communicate signals in accordance with specific communication standards, such as the Institute of Electrical and Electronics Engineers (IEEE) standards including IEEE 802.11-2007 and/or 802.11(n) standards and/or proposed specifications for WLANs, although the scope of the embodiments is not limited in this respect as wireless devices 104 and access point 102 may also be suitable to transmit and/or receive communications in accordance with other techniques and standards.

In some embodiments, any wireless device 104 may be part of a portable wireless communication device, such as a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

In some embodiments, the access point 102 may operate as a central scheduler in wireless network 100. In some multiple-input multiple-output (MIMO) embodiments, access point 102 and wireless devices 104 may each utilize two or more antennas for communicating therebetween.

Figure 2:
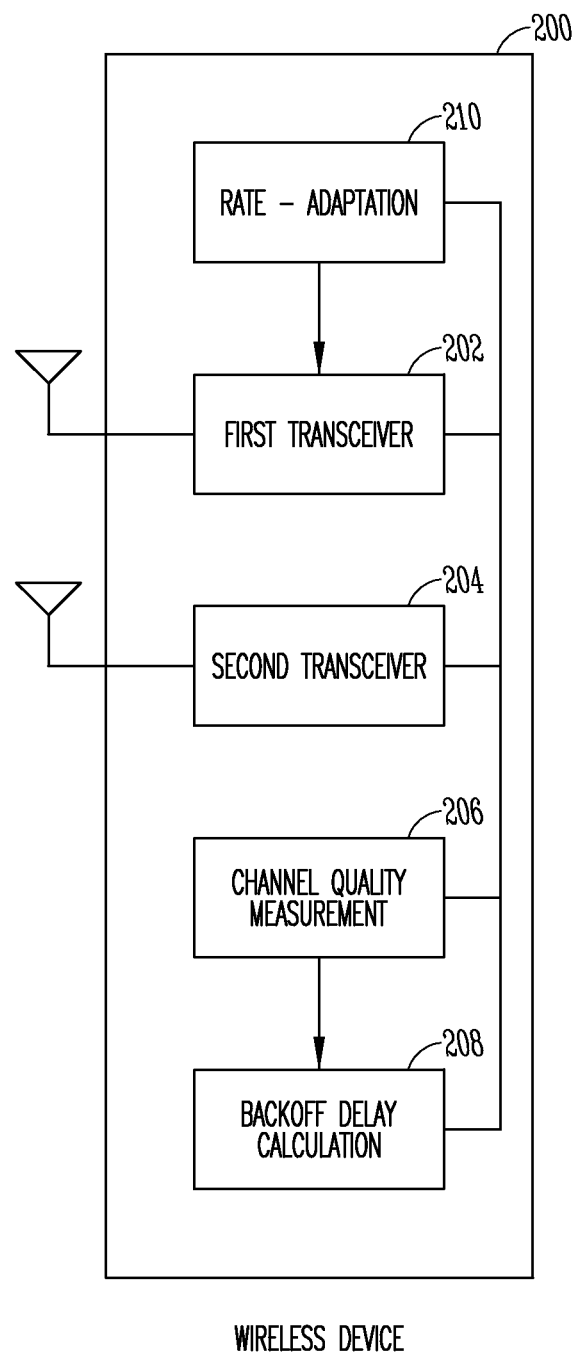
FIG. 2 is a functional block diagram of a wireless device in accordance with some embodiments.

FIG. 2 is a functional block diagram of a wireless device in accordance with some embodiments. Wireless device 200 may be suitable for use as any one of wireless devices 104 (FIG. 1) including access point 102, although other configurations of wireless devices may also be suitable. Wireless device 200 includes channel quality measurement circuitry 206 to measure the channel quality of the random-access channel 103 (FIG. 1), and backoff delay calculation circuitry 208 to calculate and set the backoff delay based on the channel quality. Wireless device 200 may also include one or more transceivers, such as transceivers 202 and 204, and rate-adaptation circuitry 210 described in more detail below.

The rate-adaptation circuitry 210 may be configured to adapt the transmit or receive data rate for transmission or reception of data packets based on either the measured or the relative channel quality. Higher data rates are used for better channel quality and lower data rates are used for poorer channel quality. Because wireless devices 104 with better relative channel quality may gain access to the channel more quickly and are configured to communicate data packets at greater data rates than wireless devices 104 with poorer relative channel quality, an overall network throughput gain may result.

In some embodiments, the first transceiver 202 may be configured to communicate with the access point 102 over the random-access channel 103 using a first frequency channel. The second transceiver 204 may be configured to communicate directly with one or more of the other wireless devices over the low-latency radio links 107 using a second frequency channel. In multichannel network embodiments, the first transceiver 202 may be a multichannel transceiver configured to communicate with access point 102 over different-frequency random-access channels.

Although wireless device 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application-specific integrated circuits (ASICs), radio-frequency integrated circuits (RFICs) and combinations of various hardware and logic circuitry for performing at least the functions described herein. In some embodiments, the functional elements of wireless device 200 may refer to one or more processes operating on one or more processing elements.

Figure 3:
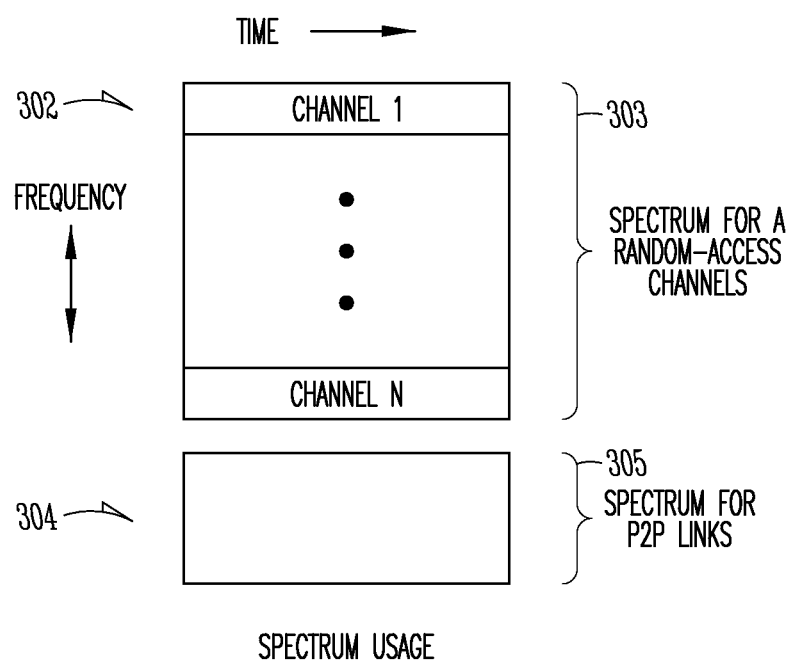
FIG. 3 illustrates spectrum usage in accordance with some embodiments.

FIG. 3 illustrates spectrum usage in accordance with some embodiments. Frequency channels 302 within spectrum 303 may be utilized by access point 102 (FIG. 1) and wireless devices 104 (FIG. 1) for communications over one or more random-access channel 103 (FIG. 1). Frequency channels 304 within spectrum 305 may be utilized by wireless devices 104 (FIG. 1) for communications over low-latency radio links 107 (FIG. 1). In multichannel embodiments, two or more random-access channels 103 within spectrum 303 are used by access point 102 for communicating with the wireless devices 104. In these multichannel embodiments, each random-access channel 103 utilizes a different one of frequency channels 302.

As illustrated in FIG. 3, spectrum 303 and spectrum 305 are separated in frequency and are orthogonal or non-interfering. In some embodiments, spectrum 303 may be in the 2.4 GHz range and/or the 5 GHz range, while spectrum 305 may be in the 60 GHz range, although this is not a requirement. In some embodiments, spectrum 303 may be within in the 1.8 to 10 GHz range.

Figure 4:
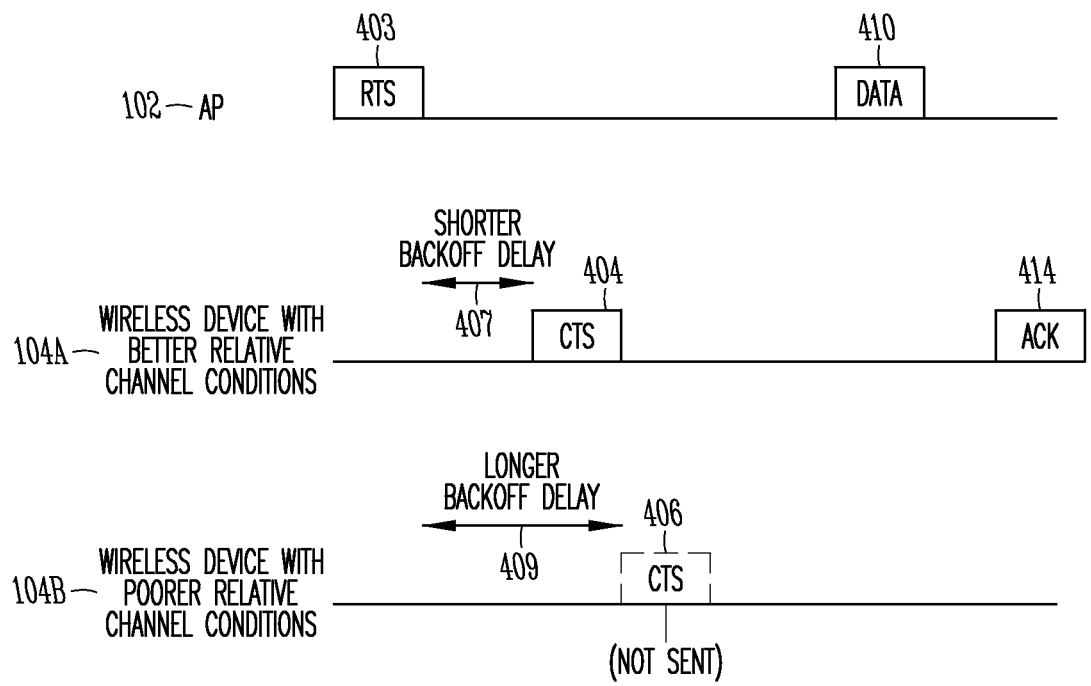
FIG. 4 illustrates backoff period adaptation in accordance with some embodiments.

FIG. 4 illustrates backoff period adaptation in accordance with some embodiments. As discussed above, a sender, such as access point (AP) 102 (FIG. 1), may transmit or broadcast an RTS packet 403 for receipt by one or more wireless devices 104 (FIG. 1), such as wireless devices 104A and 104B. Wireless devices 104A and 104B may set a backoff delay for channel access based on the channel quality. A shorter backoff delay 407 may be set by wireless device 104A with better channel quality and a longer backoff delay 409 may be set by wireless device 104B with poorer channel quality.

The wireless devices 104A and 104B may send CTS packets at a time after the set backoff delay. As illustrated in FIG. 3, wireless device 104A that set a shorter backoff delay 407 and may respond to the access point 102 with CTS packet 404. CTS packet 404 may be received by other wireless devices, such as wireless device 104B that set longer backoff delay 409, causing wireless device 104B to refrain from sending CTS packet 406. After receipt of CTS packet 404, access point 102 may grant channel access to wireless device 104A for reception of data packet 410 from the access point 102. Receipt of data packet 410 by wireless device 104A may be acknowledged by the transmission of acknowledgement (ACK) frame 414. In this way, wireless devices with better relative channel quality, such as wireless device 104A, utilize shorter backoff delays to gain access to the channel more quickly.

In some alternate embodiments, the sender, such as access point 102, may increase the rate at which the RTS packet 403 is transmitted. Wireless devices 104 with poorer channel conditions may be unable to decode this RTS packet (due to the poorer channel conditions) and do not set a backoff delay, thereby reducing potential CTS packet collisions. Wireless devices with better channel conditions may be able to decode the higher-rate RTS packet. These alternate embodiments may also allow wireless devices with better relative channel quality to gain access to the channel more quickly.

In some embodiments that do not utilize or rely on client coordination, as part of an RTS packet, the access point 102 may include the ID of the wireless device with the best channel quality as well as a channel quality indicator to indicate the channel quality of the wireless device with the best channel quality. In these embodiments, wireless devices with channel quality significantly below the indicated channel quality may refrain from attempting channel access. These alternate embodiments also allow wireless devices with better relative channel quality to gain access to the channel more quickly.

Figure 5:
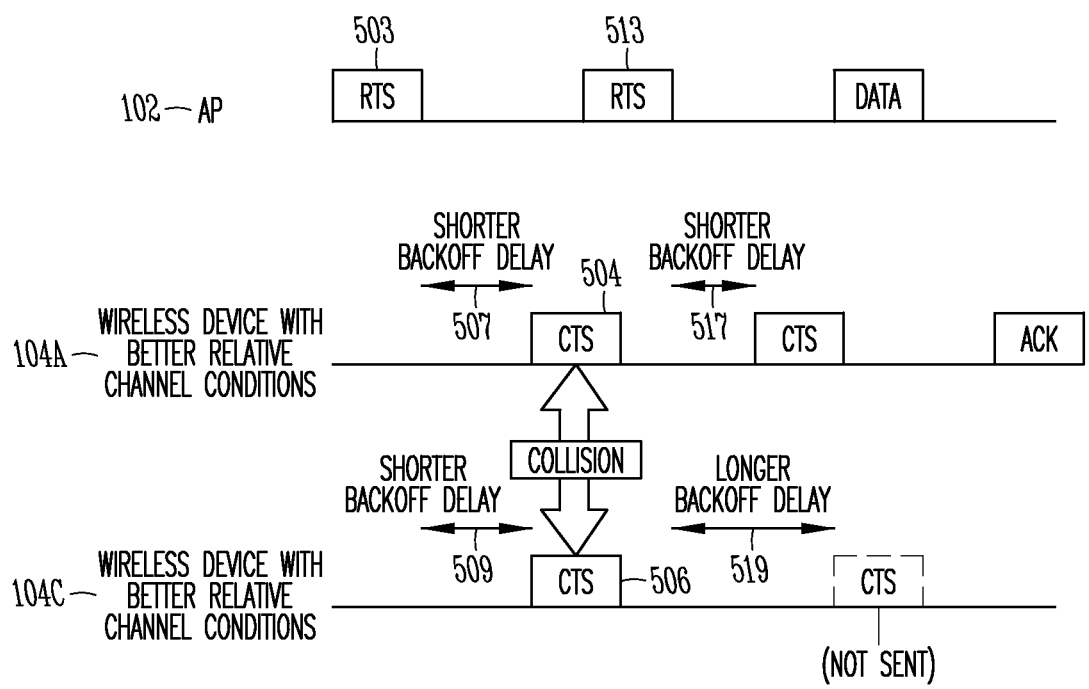
FIG. 5 illustrates collision resolution in accordance with some embodiments.

FIG. 5 illustrates collision resolution in accordance with some embodiments. As discussed above, a sender, such as access point 102 (FIG. 1), may transmit or broadcast an RTS packet 503 for receipt by one or more wireless devices 104 (FIG. 1), such as wireless devices 104A and 104C. Wireless devices 104A and 104C may set a backoff delay for channel access based on their relative channel quality. As illustrated in FIG. 5, both wireless devices 104A and 104C may have similar relative channel quality (e.g., good channel quality or better relative channel quality than other wireless devices)

and may set the same or approximately the same backoff delay (e.g., shorter backoff delays 507 and 509). As a result, a collision may occur between CTS packet 504 and CTS packet 506 transmitted respectively by wireless devices 104A and 104C. The collision may inhibit access point 102 from receiving either CTS packet.

In these embodiments, these wireless devices 104A and 104C may further adjust the backoff delay based on a random exponential backoff time to help reduce collisions of CTS packets sent by wireless devices with similar channel conditions. In this way, CTS packets from wireless devices that have similarly relatively good channel conditions are less likely to collide. As illustrated in FIG. 5, in response to receipt of RTS packet 513, wireless device 104A may set a shorter backoff delay 517 and wireless device 104C may set a slightly longer backoff delay 519 based further on a random exponential backoff time.

Although FIG. 5 illustrates that the backoff delay is further adjusted (after being set based on channel quality) based on a random exponential backoff time after the occurrence of a collision, this is not a requirement. In some embodiments, the backoff delay may be set based on both channel quality and the random exponential backoff time prior to a CTS packet collision to help avoid CTS packet collisions while still allowing wireless devices with better relative channel quality to gain access to the channel more quickly.

In some alternate embodiments, to help avoid CTS packet collisions, the sender, such as access point 102, may specify an order for transmission of the CTS packets. The order may be based on the relative channel qualities of the wireless devices 104. These alternate embodiments may also allow wireless devices with better relative channel quality to gain access to the channel more quickly.

Figure 6:
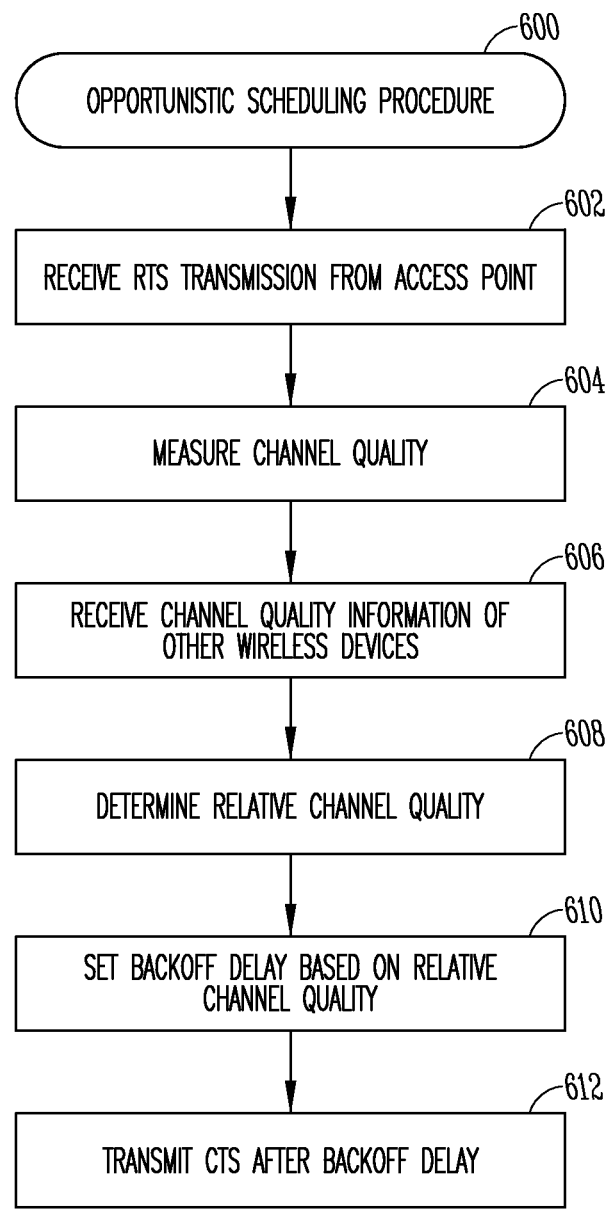
FIG. 6 is an opportunistic scheduling procedure in accordance with some embodiments.

FIG. 6 is an opportunistic scheduling procedure in accordance with some embodiments. Opportunistic scheduling procedure 600 may be performed by one or more wireless devices, such as wireless devices 104 (FIG. 1) or access point 102 (FIG. 1).

In operation 602, an RTS packet is received from an access point over a random-access channel. In multichannel embodiments, an RTS packet may be broadcasted on more than one frequency channel.

In operation 604, wireless devices may measure the channel quality of the random-access channel based on the RTS packet. In multichannel embodiments, the channel quality of two or more of the random-access channels may be measured.

In operation 606, the wireless devices may receive channel quality information from one or more other wireless devices. In some embodiments, the channel quality information may be received over low-latency radio links 107 (FIG. 1).

In operation 608, the wireless devices may determine their relative channel quality. In multichannel embodiments, the wireless devices may determine their relative channel quality for any two or more random-access channels.

In operation 610, the wireless devices may set a backoff delay based on the relative channel quality. Shorter backoff delays are set for better channel quality and longer backoff delays are set for poorer channel quality. In some embodiments, the backoff delay may be adjusted based on a random exponential backoff time to help prevent collisions between wireless devices with good channel conditions. In multichannel embodiments, wireless devices may select the random-access channel with the best channel quality or the best relative channel quality.

In operation 612, the wireless devices may transmit a CTS packet at a time after the backoff delay. In some embodiments, if a collision between CTS packets occurs, the backoff delay may be adjusted based on a random exponential backoff time to help prevent subsequent collisions. In multichannel embodiments, the CTS packet may be transmitted on the selected random-access channel.

Accordingly procedure 600 takes into account channel conditions as part of channel access scheduling. Channel access is conditioned or limited for wireless devices with poorer relative channel quality. Wireless devices with better relative channel quality, on the other hand, may gain access to the channel more quickly. Overall network throughput may be prevented from degrading by reducing or limiting access to wireless devices 104 with poorer channel conditions.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:
1. A multi-transceiver client device comprising:
a first transceiver arranged to communicate with an access point over a first random-access channel and implement a random-access protocol for communications with the access point, the first random-access channel being one of a plurality of random-access channels in a first frequency spectrum designated for communications with access points;
a second transceiver arranged to establish a low-latency radio link within a second frequency spectrum directly with a second client device; and
processing circuitry arranged to determine first channel quality information indicative of channel conditions of the first random-access channel;
wherein the second transceiver is arranged to receive second channel quality information from the second client device over the low-latency link during a contention phase of the random channel-access protocol for accessing the first random-access channel, the second channel quality information indicative of channel conditions of a second random-access channel, the second random-access channel being one of the plurality of random-access channels in the first frequency spectrum and being between the second client device and the access point,
wherein the processing circuitry is to set a backoff delay for channel access on the first random-access channel based on both the first channel quality information and the second channel quality information,
wherein the first and second frequency spectrums are non-overlapping spectrums.

2. The client device of claim 1 wherein the first frequency spectrum comprises microwave frequencies within 2.4 GHz and 5 GHz ranges, and
wherein the second frequency spectrum comprises frequencies outside the 2.4 GHz and 5 GHz ranges.

3. The client device of claim 1 wherein the first frequency spectrum comprises frequencies between 1.8 and 10 GHz, and
wherein the second frequency spectrum comprises frequencies in a 60 GHz range.

4. The client device of claim 1 wherein the first frequency spectrum comprises frequencies in one or more microwave frequency spectrums, and
wherein the second frequency spectrum comprises frequencies in a millimeter-wave frequency spectrum.

5. The client device of claim 4 wherein the random-access protocol for communications over the first random-access channel implements a request-to-send (RTS) clear-to-send (CTS) (RTS/CTS) protocol, and
    wherein the low-latency radio link, is a peer-to-peer link that is established directly between the first and second client device and does not implement a RTS/CTS protocol.

6. The client device of claim 5 wherein the second channel quality information is received from the second client device over the low-latency link immediately after receipt of an RTS packet from the access point.

7. The client device of claim 5 wherein shorter backoff delays are set by the client device when the first channel quality information indicates better channel conditions than the second channel quality information, and
    wherein longer backoff delays are set when the first channel quality information indicates worse channel conditions than the second channel quality information.

8. The client device of claim 7 wherein the wireless network is an IEEE 802.11 configured network in which channel access for communications between the first and second client devices and the access point are controlled by the access point.

9. The client device of claim 7 wherein the client device is to configure the second transceiver to provide the first channel quality information to the second client device over the low-latency radio link for use by the second client device in setting its backoff delay.

10. The client device of claim 8 wherein the low-latency radio link is a first low latency radio link,
    wherein the client device is further arranged to:
    configure the second transceiver to establish a second low-latency radio link directly with a third client device; and
    receive third channel quality information from the third client device over the second low-latency link during a contention phase of the random channel-access protocol for accessing the first random-access channel, the third channel quality information being indicative of channel conditions of a third random-access channel between the third client device and the access point,
    wherein the client device is arranged to set the backoff delay for channel access on the random-access channel based on the first channel quality information relative to both the second and the third channel quality information, and
    wherein the client device is to configure the second transceiver to provide the first channel quality information to the third client device over the second low-latency radio link for use by the third client device in setting its backoff delay.

11. A method performed by a first client device for setting backoff delay for channel access on a first random-access channel, the method comprising:
    configuring a first transceiver to communicate with an access point over a first random-access channel and implement a random-access protocol for communications with the access point, the first random-access channel being one of a plurality of random-access channels in a first frequency spectrum designated for communications with access points;
    configuring a second transceiver to establish a low-latency radio link within a second frequency spectrum directly with a second client device;
    determining first channel quality information indicative of channel conditions of the first random-access channel;
    configuring the second transceiver to receive second channel quality information from the second client device over the low-latency link during a contention phase of the random channel-access protocol for accessing the first random-access channel, the second channel quality information indicative of channel conditions of a second random-access channel, the second random-access channel being one of the plurality of random-access channels in the first frequency spectrum and being between the second client device and the access point; and
    setting a backoff delay for channel access on the first random-access channel based on both the first channel quality information and the second channel quality information,
    wherein the first and second frequency spectrums are non-overlapping spectrums.

12. The method of claim 11 wherein the first frequency spectrum comprises frequencies in one or more microwave frequency spectrums, and
    wherein the second frequency spectrum comprises frequencies in a millimeter-wave frequency spectrum.

13. The method of claim 12 wherein the random-access protocol for communications over the first random-access channel implements a request-to-send (RTS) clear-to-send (CTS) (RTS/(CTS) protocol,
    wherein the low-latency radio link is a peer-to-peer link that is established directly with the second client device and does not implement a RTS/CTS protocol.

14. The method of claim 13 wherein the second channel quality information is received from the second client device over the low-latency link immediately after receipt of a request-to-send (RTS) packet from the access point.

15. A multi-transceiver client device comprising:
    a first transceiver arranged to communicate with an access point over a first random-access channel and implement a request-to-send (RTS) clear-to-send (CTS) (RTS/CTS) random-access protocol for communications with the access point, the first random-access channel being one of a plurality of random-access channels in a first frequency spectrum designated for communications with access points;
    a second transceiver arranged to establish a low-latency radio link within a second frequency spectrum directly with a second client device, the low-latency radio link being a peer-to-peer link that is established directly with the second client device that does not implement a RTS/CTS random-access protocol; and
    processing circuitry arranged to determine first channel quality information indicative of channel conditions of the first random-access channel;
    wherein the second transceiver is arranged to receive second channel quality information from the second client device over the low-latency link immediately after receipt of a RTS packet from the access point during a contention phase of the random-access protocol for accessing the first random-access channel, the second channel quality information indicative of channel conditions of a second random-access channel, the second random-access channel being one of the plurality of random-access channels in the first frequency spectrum and being between the second client device and the access point,
    wherein the processing circuitry is to set a backoff delay for channel access on the first random-access channel based on both the first channel quality information and the second channel quality information, wherein the first and second frequency spectrums are non-overlapping spectrums.

16. The client device of claim 15 wherein the first frequency spectrum comprises microwave frequencies within 2.4 GHz and 5 GHz ranges, and
wherein the second frequency spectrum comprises frequencies in a 60 GHz range.

17. The client device of claim 16 wherein the first frequency spectrum comprises microwave frequencies within 2.4 GHz and 5 GHz ranges, and
wherein the second frequency spectrum comprises frequencies outside the 2.4 GHz and 5 GHz ranges.

* * * * *

UNITED STATES PATENT AND TRADEMARK OFFICE
CERTIFICATE OF CORRECTION

PATENT NO. : 8,472,467 B2  Page 1 of 1
APPLICATION NO. : 12/491381
DATED : June 25, 2013
INVENTOR(S) : Oyman et al.

It is certified that error appears in the above-identified patent and that said Letters Patent is hereby corrected as shown below:

Title Page, item [75], inventor, line 3, delete "E" and insert --E.--, therefor

In the Claims

Column 8, line 50, claim 1, after "information,", insert --and--, therefor

Column 9, line 5, claim 5, after "link" delete ",", therefor

Column 9, line 32, claim 10, delete "low latency" and insert --low-latency--, therefor Column 9, line 54, claim 11, before "backoff", insert --a--, therefor Column 10, line 26, claim 13, delete "(RTS/(CTS)" and insert --(RTS/CTS)--, therefor Column 10, line 67, claim 15, after "information,", insert --and--, therefor Column 11, line 8, claim 17, delete "16" and insert --15--, therefor Signed and Sealed this
Twenty-fifth Day of November, 2014

Michelle K. Lee
*Deputy Director of the United States Patent and Trademark Office*